H. BLANKSMA.
GREASE CUP.
APPLICATION FILED JULY 9, 1917.

1,292,572.

Patented Jan. 28, 1919.

WITNESSES
R. T. Hoge

INVENTOR
H. Blanksma
BY Victor J. Evans
ATTORNEY

UNITED STATES PATENT OFFICE.

HERMAN BLANKSMA, OF BAIRD, WASHINGTON.

GREASE-CUP.

1,292,572.   Specification of Letters Patent.   Patented Jan. 28, 1919.

Application filed July 9, 1917. Serial No. 179,569.

*To all whom it may concern:*

Be it known that I, HERMAN BLANKSMA, a citizen of the United States, residing at Baird, in the county of Douglas and State of Washington, have invented new and useful Improvements in Grease-Cups, of which the following is a specification.

This invention relates to grease cups of the ejecting plug type and has for one of its objects the provision of simple and practical means for locking the plug against rotation relative to the grease container.

Another and more specific object of the invention is to provide a grease cup having an interiorly threaded container into which screws an ejecting plug, the plug being formed with a plurality of longitudinal grooves in which a locking pin is received, said pin being spring pressed and held in inoperative position by a shoulder which may be engaged with the exterior of the cup.

The invention also aims to generally improve grease cups of this nature to render them more practical, useful and commercially desirable.

With these and other objects in view as will become more apparent as the description proceeds, the invention consists in certain novel features of construction, combination and arrangement of parts as will be hereinafter fully described, illustrated and claimed.

In the drawing.

Like characters of reference indicate like parts in the various views.

Figure 1:
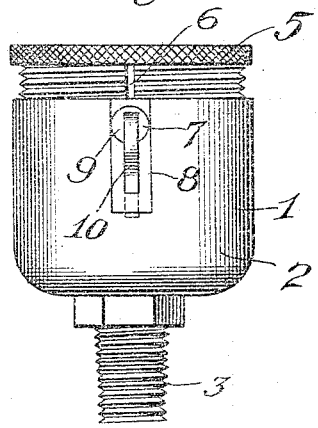
Figure 1 is a side elevation of the grease cup.

Referring in detail to the drawing by numerals, 1 designates as an entirety the grease cup having a grease container or receptacle 2 having a stem 3 and formed with interior screw threads 4. A grease ejecting plug 5 screws into the upper open end of the grease receptacle to eject grease through the stem 3 and this plug is externally threaded for engagement with the interior threads of the receptacle. The plug is also provided with longitudinal peripheral grooves 6 for engagement by the locking pin 7.

The cup is formed exteriorly with a boss or enlargement 8 formed with a central opening through which extends the locking pin 7. The pin is provided with a head 9 which is engaged by a flat spring 10 secured at one end to the boss as indicated at 11.

The pin when in working position engages in one of the longitudinal grooves 6 of the plug and holds the plug against rotation relative to the container. To allow the pin to be retained in inoperative position, so that the plug may be removed for filling purposes, I provide the pin with a shoulder or wing 12 positioned adjacent the head 9 and extending radially with respect to the pin. The shoulder is received, when the pin is in working position, in the recess or pocket 13 opening upon the bore through the boss and the outer face of the boss. To secure this pin in inoperative position, it is retracted and given a partial turn to engage the wing 12 with the outer face of the boss.

Figure 5:
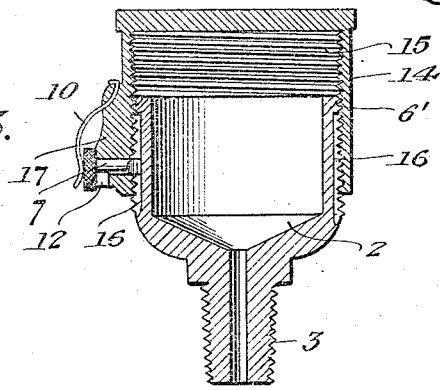
Fig. 5 is a longitudinal sectional view showing a modification of my invention.

In the modification, as shown in Fig. 5, an ejecting cup 14, is substituted for the ejecting plug 5 of the preferred structure, the cup being formed with interior screw threads 15, and the container or receptacle 2 being externally threaded for engagement with the screw threads 15 of the cup. The receptacle 2 of this modification is provided with longitudinal peripheral grooves 16, and the cup 14 is formed exteriorly with a boss 17 formed with a central opening through which extends the locking pin 7. The form and structure of the locking pin 7 and its correlated parts is exactly the same as that illustrated in the other figures, as hereinbefore described, and requires no further description.

Figure 2:
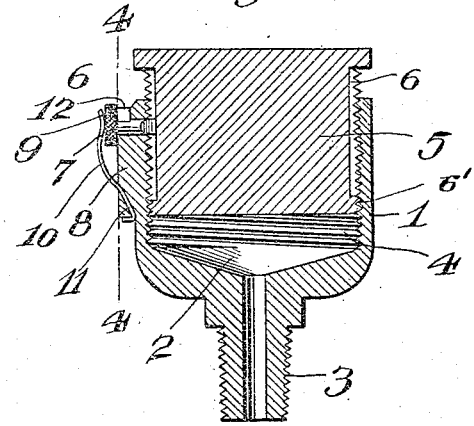
Fig. 2 is a longitudinal sectional view therethrough showing the locking means.
Figure 3:
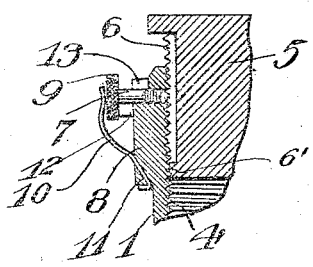
Fig. 3 is a fragmentary sectional view showing the locking pin in inoperative position.
Figure 4:
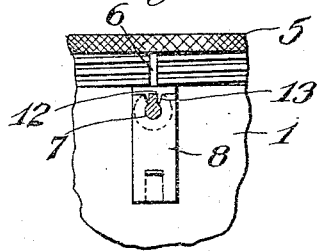
Fig. 4 is a section on the plane of line 4—4 of Fig. 2.

It will be noted that the peripheral grooves 6 do not extend the entire length of the plug 5, as designated in Figs. 2 and 3, or the receptacle 2, as designated in Fig. 5, there being a portion of the screw threads left complete, as designated at 6' in the drawings.

From the foregoing description taken in connection with the accompanying drawing, it will be evident that I have provided a very simple and practical locking means for grease cup plugs which will prevent the plugs rotating relative to the containers and which may be held inoperative for any changes desired.

While I have shown and described the preferred embodiment of my invention it will be clearly understood that I do not wish to be limited to this construction, but may make such changes as will fall within the scope and spirit of the invention as claimed.

What I claim is:—

A grease cup comprising a pair of members screw threadedly connected together, one of said members having longitudinal exterior grooves and the other member having a boss, an opening extending inwardly through the boss and a recess leading to said opening, a pin slidably and revolubly mounted in said opening, arranged for engagement at its inner end with one of the grooves of the other member and provided at its outer end with a head and also with a wing to engage either in the recess or on the outer side of the boss, and a spring arranged exteriorly of the boss, having one end attached thereto and bearing on the head of the pin to hold the same either in engaged or disengaged position.

In testimony whereof I affix my signature.

HERMAN BLANKSMA.

Copies of this patent may be obtained for five cents each, by addressing the "Commissioner of Patents, Washington, D. C."